US006747274B2

(12) United States Patent
Li

(10) Patent No.: US 6,747,274 B2
(45) Date of Patent: Jun. 8, 2004

(54) HIGH THROUGHPUT MASS SPECTROMETER WITH LASER DESORPTION IONIZATION ION SOURCE

(75) Inventor: Ganggiang Li, Palo Alto, CA (US)

(73) Assignee: Agilent Technologies, Inc., Palo Alto, CA (US)

(*) Notice: Subject to any disclaimer, the term of this patent is extended or adjusted under 35 U.S.C. 154(b) by 267 days.

(21) Appl. No.: 09/919,654

(22) Filed: Jul. 31, 2001

(65) Prior Publication Data

US 2003/0025074 A1 Feb. 6, 2003

(51) Int. Cl.[7] .......................... B01D 59/44; H01J 49/00

(52) U.S. Cl. ....................................... 250/288; 250/287

(58) Field of Search ................................ 250/288, 287, 250/281, 423 P

(56) References Cited

U.S. PATENT DOCUMENTS

| | | | | |
|---|---|---|---|---|
| 4,988,879 A | * | 1/1991 | Zare et al. | 250/423 P |
| 5,965,884 A | | 10/1999 | Laiko et al. | |

* cited by examiner

*Primary Examiner*—Stephen D. Meier
*Assistant Examiner*—Alfred E Dudding
(74) *Attorney, Agent, or Firm*—Michael J. Beck

(57) ABSTRACT

A high-throughput laser desorption/ionization (LDI) mass spectrometer has been developed and is described herein. The mass spectrometer employs an ion source that has a plurality of lasers firing in tandem at one or more samples to increase the rate at which ion packets are generated by the ion source.

43 Claims, 6 Drawing Sheets

HIGH THROUGHPUT MASS SPECTROMETER WITH LASER DESORPTION IONIZATION ION SOURCE

DESCRIPTION

1. Field of the Invention

The invention relates generally to mass spectrometry. The invention more specifically relates to a mass spectrometer having an ion source that permits high throughput sample analysis and a method for rapidly ionizing one or more samples in a mass spectrometer.

2. Background of the Invention

Mass spectrometers are instruments used to analyze ions with respect to their mass to charge ratio (m/z) to determine the chemical structures of molecules. In these instruments, molecules become positively or negatively charged in an ion source; the resulting ions are then transported to a mass analyzer, which measures their mass/charge (m/z) ratio. Mass analyzers come in a variety of types, including magnetic sector field (B), combined (double-focusing) electrostatic and magnetic field (EB), quadrupole (Q), ion cyclotron resonance (ICR), quadrupole ion trap (IT), and time-of-flight (TOF) mass analyzers.

The analysis of ions using a time-of-flight mass spectrometer (TOFMS) is, as the name suggests, based on the measurement of the flight times of ions as the ions travel through a field free region. Ions are typically extracted from an ion source in small packets and accelerated to a constant kinetic energy in a high voltage field. The velocities of the ions at constant kinetic energy varies according to the mass-to-charge ratio of the ions. Lighter ions will have greater velocities and will arrive at a detector earlier than high mass ions. Determining the time-of-flight of the ions through the drift chamber of the TOF mass analyzer to the ion detector permits the determination of the masses of different ions.

In a TOFMS instrument, single-charged molecular and fragment ions formed in the source are accelerated to a kinetic energy:

$$eV=\tfrac{1}{2}\, mv^2 \qquad \text{(eq. 1)}$$

where e is the elemental charge, V is the potential across the source/accelerating region, m is the ion mass, and v is the ion velocity. These ions pass through a field-free drift region with velocities given by equation 1. The time (t) required for a particular ion to travel across the drift region is directly proportional to the square root of the mass/charge ratio:

$$t=L(m/2eV)\hat{\ }0.5 \qquad \text{(eq. 2)}$$

where L is the length of the ion flight path. Conversely, the mass/charge ratios of ions can be determined from their flight times according to the equation:

$$m/e=at^2+b \qquad \text{(eq. 3)}$$

where a and b are constants which can be determined experimentally from the flight times of two or more ions of known mass/charge ratios.

Since the earlier concept of time-of-flight instrument described by Stephens (W. E. Stephens, Bull. Am. Phys. Soc. 21, p22 (1946), a number of strategies have been employed for improving the performance of mass spectrometers. Significant improvement has been achieved, especially in mass resolving power. These strategies include the use of space and time-lag focusing (a method for spatial and energy focusing), as described by Wiley and McLaren (Wiley and McLaren, Rev. Sci. Instrum 26 (1955) 1150), the use of ion reflectron by Mamyrin et al. to compensate for energy spread of ions of equal mass-to-charge ratio (Mamyrin et al., Sov. Phys. JETP 37 (1973) 45), and the use of orthogonal ion extraction as described by Guilhaus et al. (U.S. Pat. No. 5,117,107) for increasing instrument duty cycle and reducing the influence of the initial energy spread of ions. A commercial instrument employing Wiley-McLaren technology was supplied by Bendix Corporation (Model NA-2) and later by CVC Products (Model CVC-2000).

A time-of-flight mass spectrometer can also be used as a basic platform for a tandem mass spectrometer. A tandem mass spectrometer is an instrument that combines two or more mass analyzers in a single instrument (MS/MS, MS/MS/MS, etc.) in combination with an ion-molecule collision cell. Tandem mass spectrometers have a particular advantage for structural analysis in that the first mass analyzer (MS1) can be used to measure and select a molecular ion from a mixture of molecules, while the second mass analyzer (MS2) can be used to analyze the fragment ions derived from the selected molecular ion. The fragment ions usually are produced in collision cell via collisional induced dissociation (CID).

The most remarkable advantage of time-of-flight mass spectrometer is theoretically unlimited mass range it can detect. This renders TOFMS instruments particularly powerful for biochemical applications. However, until the early 1970's, most published TOFMS instruments employed electron impact ionization (EI). This ionization technique was limited only to volatile samples. The ionization of biological samples was made possible with secondary ion mass spectrometry (SIMS). SIMS was used to analyze peptides (Benninghoven et al., SIMS V, Springer Series in Chem. Phys. 44 (1986)). Other technologies useful in assessing biological samples include fast atom bombardment (FAB) (Chait et al., Int. J. Mass Spectrom. Ion. Phys. 40 (1981) 185), $^{252}$Cf plasma desorption (McFarlane et al., Science 191 (1976) 920), laser-desorption ionization (LDI) (Hillenkamp et al., Appl. Phys. 8 (1975) 341), and electrospray ionization (ESI) (Fenn et al., Science 246 (1989) 64). The use of a reflectron in a laser microprobe instrument is described by Hillenkamp et al. (Appl. Phys. 8 (1975) 341). An instrument of similar design using LDI was produced by Leybold Hereaus as the LAMMA (LAser Microprobe Mass Analyzer). Cambridge Instruments produced a similar instrument called the Laser Ionization Mass Analyzer. Grotemeyer et al. (Org. Mass Spectrom. 22 (1987) 758) have used an instrument employing two lasers. The first laser is used to ablate solid samples, while the second laser forms ions by multiphoton ionization. A similar instrument has been manufactured commercially by Bruker.

An important category in LDI is so called matrix assisted laser desorption ionization (MALDI) technique described by Tanaka et al. (Rapid Commun. Mass Spectrom. 2 (1988) 151) and Karas et al. (Anal. Chem. 60 (1988) 2299). In MALDI, a sample (analyte) is mixed with an excess solution of matrix such as nicotinic acid and dispersed on an electrically conductive sample plate. The matrix absorbs the energy from a short laser pulse and produces a gas plasma, resulting in vaporization and ionization of the analyte. The combination of MALDI technique and TOFMS forms a powerful platform for analyzing biological samples such as DNAs, RNAs, peptides and proteins. Using MALDI-TOFMS biological samples of molecular weight range from several thousands to several hundred-thousand Dalton have been successfully ionized and analyzed.

In tandem instruments, fragmentation of the selected molecular ions to form fragment ions is induced in the region between the two mass analyzers. In one typical method of inducing fragmentation known as collision induced dissociation CID, the selected molecular ions are introduced into a collision chamber filled with an inert gas. The collisions of the ions and the inert gas to yield fragment ions may be carried out at high (5–10 keV) or low (10–100 eV) kinetic energies, or may involve specific chemical (ion-molecule) reactions. Other methods of inducing fragmentation include surface induced dissociation (colliding ions with surfaces to induce fragmentation), electron induced dissociation (using electron beams to induce fragmentation), or photodissociation (using laser radiation to induce fragmentation). The molecular ions may optimally dissociate at specific chemical bonds. The mass/charge ratios of the resulting fragment ions are used to elucidate the chemical structure of the molecule. It is possible to perform such an analysis using a variety of types of mass analyzers including TOF mass analyzers. The use of tandem mass spectrometers, such as a TOFMS-TOFMS combination or quadrupole-time-of-flight mass spectrometer (Q-TOF), when utilized with a collision cell has enabled the elucidation of the structure of large molecules including many biological compounds. Other LDI methods include preparing analytes on a modified silicon substrate (Wei et al., Nature 399 (1999) 243) or a thin film substrate (McComb et al., Rapid Commun. Mass Spectrom. 11 (1997) 1716).

Another strength of TOFMS instruments is the ability to determine the exact molecular weight of ions. Many of the commercial instruments combining ESI-TOFMS or MALDI-TOFMS are able to resolve the molecular weight to less than ten parts per million. Such mass determination accuracy is essential for peptide mapping and protein identification through database searching. In combination with laser ionization, LDI-TOFMS also achieved a high duty cycle of the detection. A large portion of ions produced with laser ionization can be ultimately detected since both of are ionization and extraction are inherently pulsed.

Moreover, TOF mass analyzers are very fast. Usually, the mass-to-charge ratio of a relatively large molecule can be determined in less than one millisecond. According to equation 2, a molecule of 100,000 Dalton can be recorded in 320 microseconds using a TOFMS with 2 meter drift path and 20 kV acceleration. Consequently, TOFMS is a primary choice for high-throughput mass analysis. In protein analysis, identification of large quantity of samples often is required on a day-to-day basis operation. In MALDI-TOFMS, efforts to increase throughput has been made by increasing the frequency of laser pulses (Loboda et al., Rapid Commun. Mass Spectrom. 14(2000) 1047).

FIG. 1 illustrates a laser desorption/ionization mass spectrometer as known in the art. In FIG. 1, a timing control circuit 100 activates a laser generator 102. A short laser pulse is focused onto a sample 104 carried on a sample plate 106 to desorb and ionize the analyte from the sample plate 106 surface. At the same time or after a short delay time (Colby et al., Rapid Commun. Mass Spectrom. 8 (1994) 865) a high voltage pulse, or extraction pulse, generated by an extraction pulse circuit 120 is applied to the sample plate 106 to generate a high electric field between sample plate 106 and electrode R1 108, accelerating the ions via electrode R2 110 towards a TOF mass analyzer 112. The ions travel through the TOF mass analyzer 112 and are recorded by an ion detector/preamplifier 114 and a data acquisition system 116. The spectral data obtained are then stored in a digital storage system 118 for future analysis. Neglecting the time needed for accelerating the ions from the ion extraction device (sample plate 106, electrode R1 108, and electrode R2 110) and delays in the electronic circuit, the analysis time, i.e., the flight time of ions, is given by Eq. 2, above. Generally, the flight time is less than 1 millisecond even for very large biomolecules.

A drawback of such a conventional MALDI-TOF instrument is that it is relatively "slow" in comparison with other ionization techniques. Most commercial laser generators deliver laser pulses between 1 to 100 Hz, typically 10 to 20 Hz. Normally, an accumulated ion signal of 100 laser shots is needed to obtain a spectrum with an adequate signal to noise ratio. Using a laser pulse of 10 Hz, this leads to an analysis time of 10 seconds for each sample, not including sample preparation and sample position. In comparison, TOFMS is capable of analyzing the ions in much higher speed. For a typical MALDI-TOF instrument using an acceleration voltage of 20 kV and a flight path of 2 meters, only approximately 320 $\mu$s is needed for recording of a spectrum of mass up to 100,000 Daltons. Considering only the speed of TOFMS, the time required for accumulating 100 ion pulses is only 32 ms, which is more than 300 times faster than that can be delivered by the commercial laser generators.

It would be particularly useful to provide a mass spectrometer in which the mass analyzer is operated at or near its maximum rate of throughput. Thus, it would be advantageous to have an ion source capable of delivering ion packets to the mass analyzer more frequently.

SUMMARY

Accordingly, a high-throughput laser desorption/ionization (LDI) mass spectrometer has been developed and is described herein. The mass spectrometer employs an ion source which comprises a plurality of lasers firing in tandem at one or more samples to increase the rate at which ion packets are generated by the ion source. The ion source is in operable association with a mass analyzer, preferably a time-of-flight mass analyzer, to provide the ion packets to the mass analyzer. The ion source may be used in other types of mass spectrometer instruments, e.g. Fourier transform ion cyclotron resonance (FT-ICR) instruments or quadropole-time-of-flight (QTOF) instruments. Timing circuitry associated with the ion source is used to control the firing of each laser and the application of an extraction pulse to deliver the ion packets to the mass analyzer. The generation of the extraction pulse is generally initiated simultaneously with the firing of the laser or within a short period of time thereafter. The samples are arranged on a sample plate which is preferably mounted on a moveable stage. Multiple lasers may be focused on a single sample, or each laser may be focused on a separate sample. When the sample(s) has been analyzed, the moveable stage may be advanced to bring the next samples online.

Also described is a method for performing high-throughput LDI mass spectrometry by using multiple lasers firing in tandem to generate ion packets in tandem and supplying the ion packets to a mass analyzer in a mass spectrometer. In the method, each firing of a laser results in an ion packet, which is analyzed in the mass analyzer prior to the firing of the next laser. When each laser has fired, the cycle starts over with the first laser.

DETAILED DESCRIPTION

Figure 1:
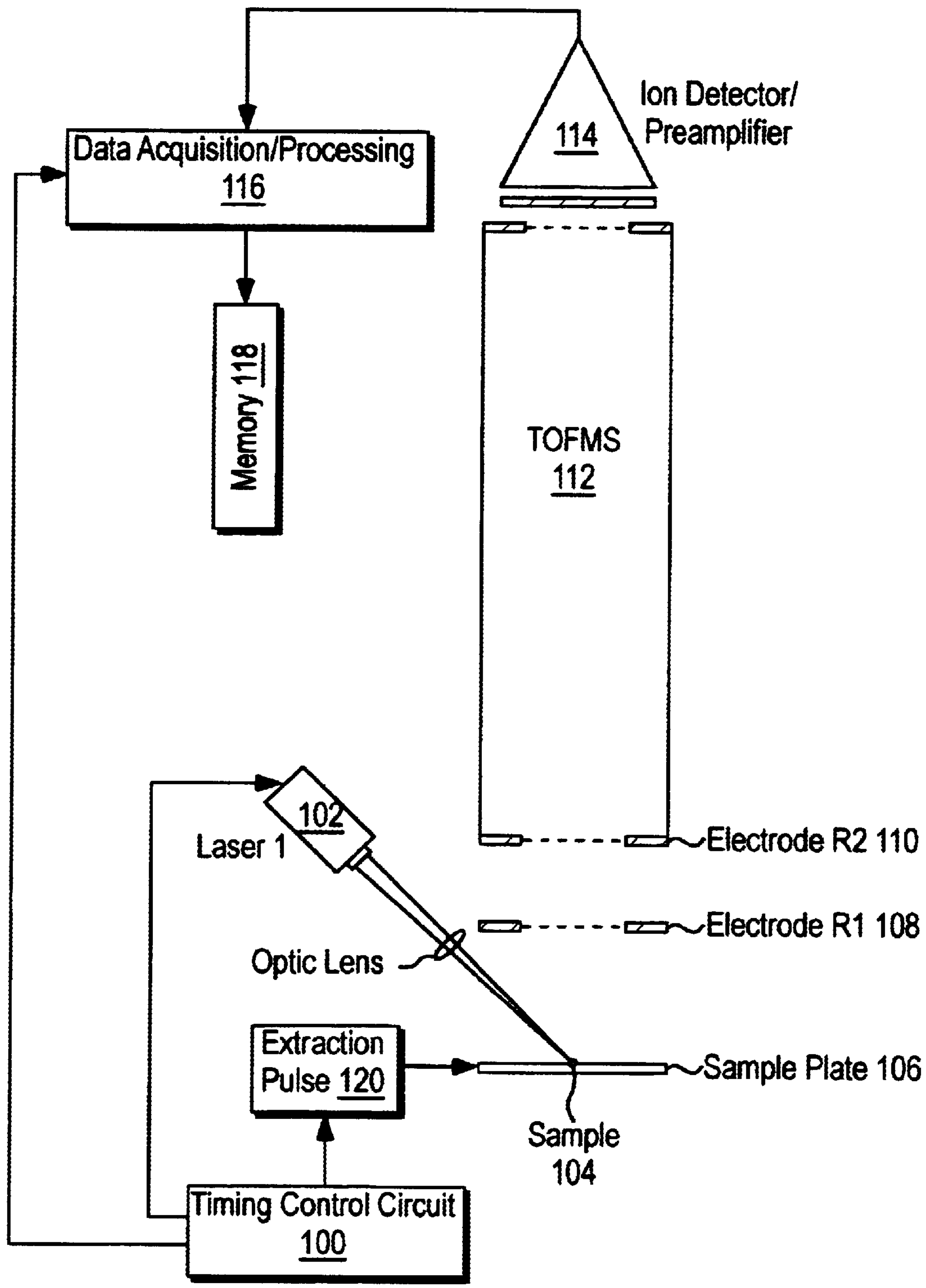
FIG. 1 schematically illustrates the workings of a prior art mass spectrometer with a laser desorption/ionization ion source.

Before the invention is described in detail, it is to be understood that unless otherwise indicated this invention is not limited to particular materials, components or manufacturing processes, as such may vary. It is also to be understood that the terminology used herein is for purposes of describing particular embodiments only, and is not intended to be limiting.

It must be noted that, as used in the specification and the appended claims, the singular forms "a," "an" and "the" include plural referents unless the context clearly dictates otherwise. Thus, for example, reference to "a mass analyzer" includes a plurality of mass analyzers. In this specification and in the claims that follow, reference will be made to a number of terms that shall be defined to have the following meanings:

"Memory" refers to any device or means used to record information about a spectrum in a mass spectrometer, including especially computer memory that may be accessed by a microprocessor that is a component of the mass spectrometer, and includes such embodiments as random access memory, flash memory cards, etc. Memory may also refer to specific storage on a computer hard or floppy drive, such as files saved on the drive. Memory may be any suitable device in which date can be stored in a retrievable form, such as magnetic, optical, or solid state storage devices (including magnetic or optical disks or tape or RAM, or any other suitable device, either fixed or portable). Memory may also include other substitutes for the above described examples, as are well known in the art. The microprocessor may include a general purpose digital microprocessor suitably programmed from a computer readable medium carrying necessary program code, to execute all of the steps required by the present invention, or any hardware or software combination which will perform those or equivalent steps. The programming can be provided remotely to processor, or previously saved in a computer program product such as memory or some other portable or fixed computer readable storage medium using any of those devices mentioned in connection with memory. For example, a magnetic or optical disk may carry the programming, and can be read by disk reader. The microprocessor may be configured to control the timing control circuit, or, in some embodiments, the timing control circuit may be a portion of the microprocessor and related memory (i.e. the microprocessor may serve as the timing control circuit, in addition to performing other functions).

"Extraction pulse" refers to a high voltage pulse in a mass spectrometer which generates an electric field that causes ions in the vicinity of the sample plate to be accelerated, generally towards the mass analyzer. An "ion packet" is a group of ions that is or will be subject to analysis in a mass analyzer, especially ions that are formed essentially at the same time under essentially the same conditions. "Laser pulse" refers to a short burst of radiation emitted from a laser.

"Optional" or "optionally" means that the subsequently described circumstance may or may not occur, so that the description includes instances where the circumstance occurs and instances where it does not. For example, if a device optionally contains a feature for focusing light on a sample, this means that the light focusing feature may or may not be present, and, thus, the description includes structures wherein a device possesses the light focusing feature and structures wherein the light focusing feature is not present.

A description of the high throughput laser desorption/ionization mass spectrometer and the methods of the current invention follows. The description may be understood with reference to the Figures, wherein the same reference number represents the same or similar elements described. The improved LDI mass spectrometer of the invention has increased analysis speed, allowing higher sample throughput than that achieved with previously available LDI-TOF mass spectrometers. The increased speed of sample analysis is achieved by using more than one laser generator. Alternating laser pulses from two laser generators doubles the speed of ion production and therefore doubles the speed of sample analysis with the same TOFMS analyzer. Using three laser generators triples the analysis speed, and so on.

Figure 2:
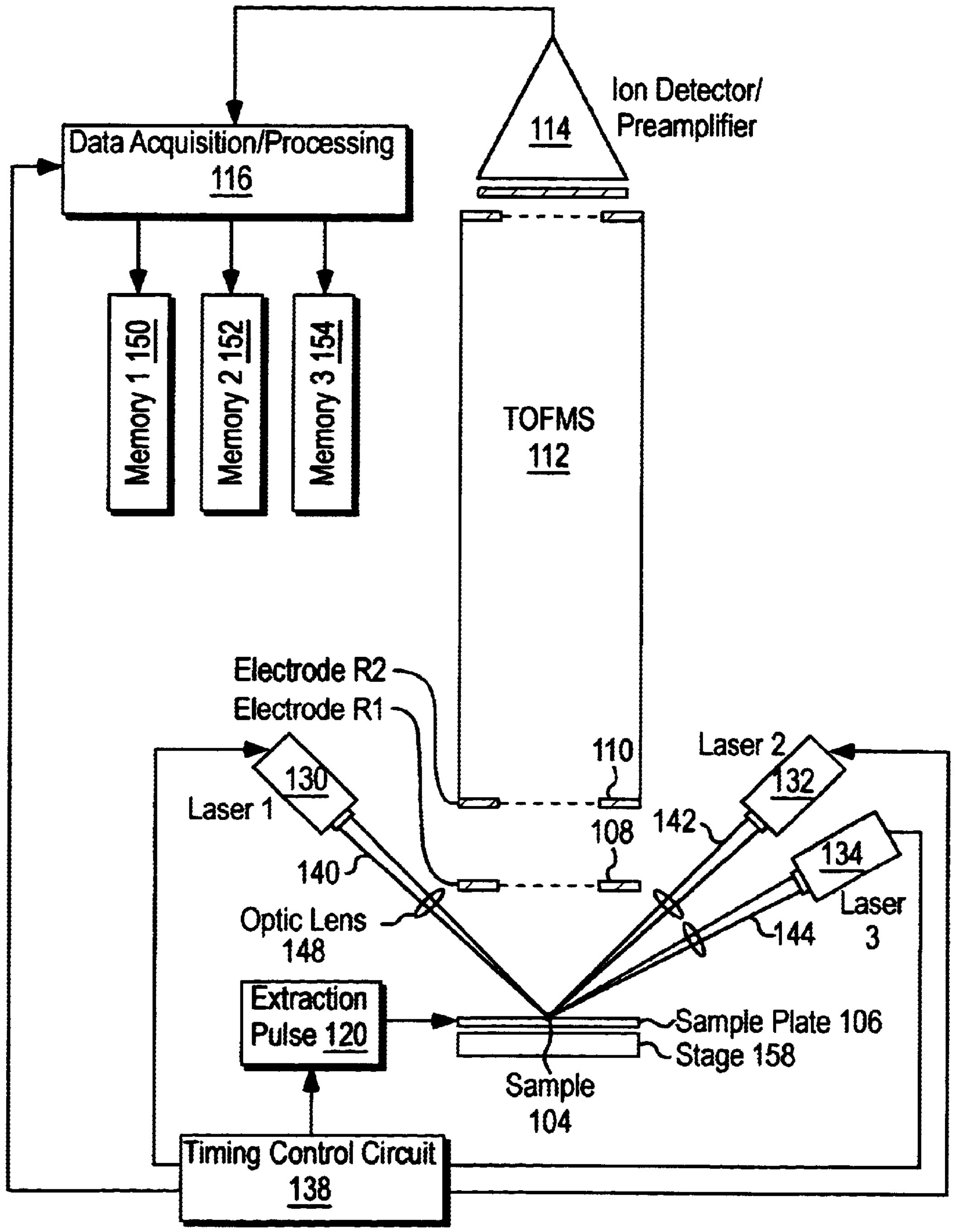
FIG. 2 schematically illustrates the use of a high-throughput ion source having a plurality of lasers, as described herein.

FIG. 2 depicts an embodiment which utilizes a single TOF analyzer 112 and three laser generators 130, 132, 134. In this embodiment, a timing control circuit 138 capable of controlling multiple laser generators controls ionization, ion extraction and the detection process. Samples 104 are deposited as a sample array on a sample plate 106 which is movable in three perpendicular directions. Each of the three laser generators 130, 132, 134 is capable of generating a laser pulse, or laser beam, depicted, respectively, as 140, 142, 144. The three laser beams 140, 142, 144 are focused onto one sample 104 to be analyzed. The laser beams 140, 142, 144 may be focused on the sample 104 via an optional focusing means, such as an optic lens 148. In use, the timing control circuit 138 triggers the first laser generator 130 to emit a laser pulse 140 for ionization of the sample 104, resulting in an ion packet. After a certain delay time (optional), an extraction pulse generated by an extraction pulse circuit 120 is applied to a sample plate 106 to accelerate the ions in the ion packet towards the TOF analyzer 112. Then a second laser 132 is triggered and ion extraction repeated, and then the third laser 134 is triggered followed by extraction of the ions produced. When the last laser of the series (i.e. the third laser 134 in this example) has fired, the process continues with the firing of the first laser 130, etc. Signals received from the ion detector/ preamplifier 114 (spectra) are recorded by the data acquisition/processing system 116 and stored in the first memory 150 or separately in the first memory 150, the second memory 152, and the third memory 154. These spectra are normally then accumulated into a single spectrum because they are generated from the same analyte sample. The sample plate 106 is mounted on a three-way adjustable stage 158 allowing the sample plate to be positioned as desired in three axes (i.e. x-, y-, and z-axes). The sample plate 106 may have more than one sample deposited on its surface; in such a case, once the desired number of spectra of the first sample are recorded, the sample plate is moved so that all three laser beams are focused onto the next sample, i.e., sample 2, and so on.

Figure 3:
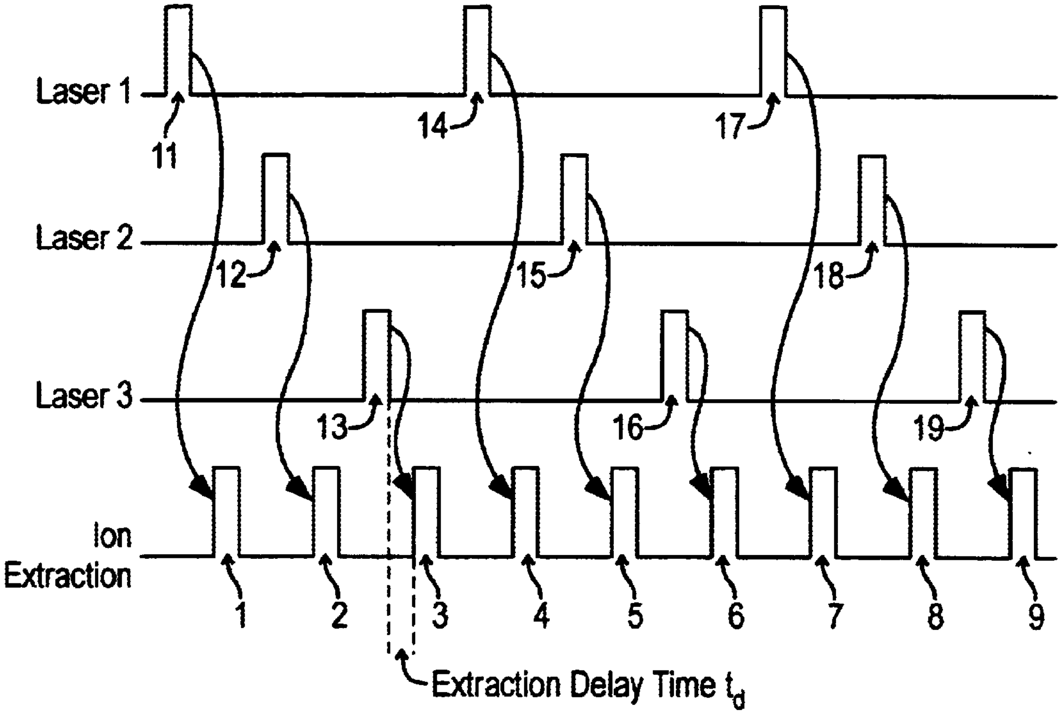
FIG. 3 is a timing diagram displaying the relationship between the firing of the lasers and the ion extraction pulses.

FIG. 3 is a timing diagram that depicts the ionization and ion extraction process. The top line of this figure shows an example of the timing of laser pulses 11, 14, 17 for the first laser. The second line shows an example of the timing of laser pulses 12, 15, 18 for the second laser and further shows the relationship in timing of laser pulses between the first laser and the second laser. Similarly, the third line shows an example of the timing of laser pulses 13, 16, 19 for the third laser and further shows the relationship in timing of laser pulses between the first laser, the second laser, and the third laser. The fourth line of the figure shows that extraction pulses 1, 4, and 7 are applied adjacent laser pulses of the first laser, and extraction pulses 2, 5, 8 and 3, 6, 9 are applied adjacent pulses from the second laser and the third laser, respectively. As depicted by the dashed lines immediately preceding extraction pulse 3, the extraction pulses typically are delayed from the laser ionization/desorption pulses. This extraction delay time ($t_d$) is needed to achieve high mass resolution. The extraction delay time will generally be in the range of 100 nanoseconds to 500 microseconds, preferably 500 nanoseconds to 150 microseconds, or more preferably 1 microsecond to 100 microseconds.

The timing diagram of FIG. 3 illustrates the timing for an embodiment where three laser generators are present. However, the embodiment can utilize more than three lasers. The time between each laser pulse must be at least the time required for the ions generated to be analyzed in the mass analyzer, so that there is no overlap of ions from different packets in the mass analyzer. As a practical matter, the lower range for the time period between laser pulses is on the order of about one millisecond (about a 1000 Hz pulse rate), perhaps as low as about 0.5 milliseconds (about a 2000 Hz pulse rate maximum) or about 0.33 milliseconds (about a 3000 Hz pulse rate maximum). The lower range may also be limited by overheating in the sample by the repeated irradiation of the sample by the laser. An embodiment of the invention having five lasers, each capable of firing at 20 Hz, would generally produce on average a laser pulse every ten milliseconds (5×20=100 pulses per second). An embodiment of the invention having two lasers, each capable of firing at 5 Hz, would generally produce on average a laser pulse every one hundred milliseconds (2×5=10 pulses per second). If, in the previous example, the lasers could be fired at a higher frequency of, e.g., 10 Hz, laser pulses would be produced on average every 50 milliseconds (2×10=20 pulses per second). Also, the total ionization pulses per second generated from all lasers combined must be equal or less than the repetition rate of the TOF analyzer (the highest rate at which the TOF analyzer can analyze samples without overlap of ions from separate ion packets).

Any type of laser known to be useful for laser desorption/ionization may be useful in the practice of the invention. Particularly useful are those lasers known to be useful in matrix assisted laser desorption/ionization (MALDI) methods. For MALDI-MS, lasers with wavelength in the near UV (UV-A) are widely used, for instance, nitrogen lasers with a wavelength of 337 nm or frequency tripled Nd:YAG lasers at a wavelength of 355 nm. Other wavelengths include infrared 1.06 $\mu$m of Nd:YAG laser and far infrared 10.6 $\mu$m of $CO_2$ laser. Generally, a laser beam of power $10^6$ to $10^8$ W/cm$^2$ is focused onto the sample surface in a spot several tens to several hundreds of micrometers in diameter, emitting for several tens of picoseconds to several tens of nanoseconds. Depending on the application, all of the lasers may provide light of the same wavelength, or one or more of the lasers may provide light of a different wavelength than that provided by the other laser(s) present.

Figure 4:
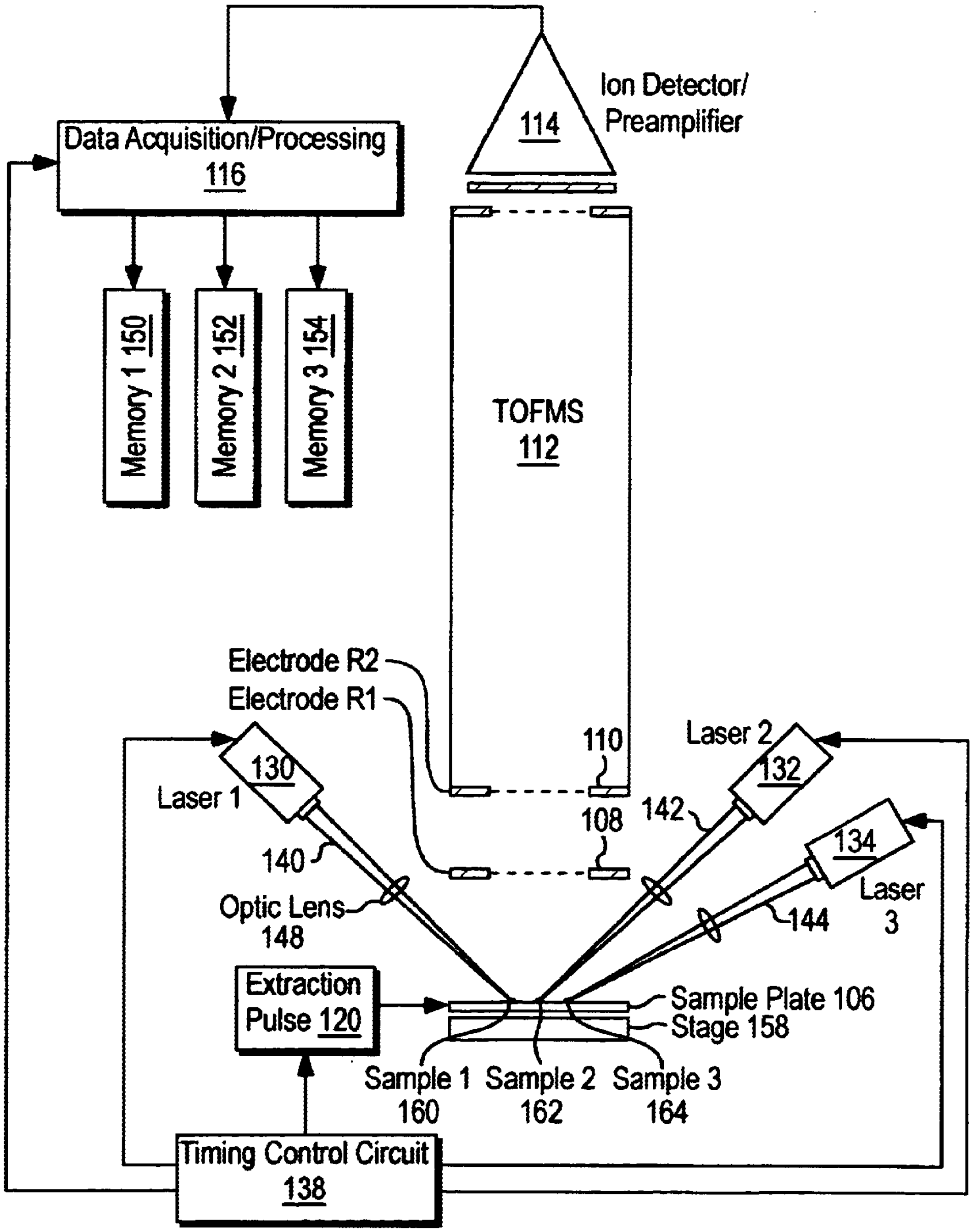
FIG. 4 schematically illustrates an alternate use of a high-throughput ion source having a plurality of lasers where each laser is focused on a separate sample.

In another embodiment of the invention, schematically illustrated in FIG. 4, multiple samples are loaded onto the sample plate 106 of the apparatus. Laser radiation from each laser generator is focused on a different sample. This embodiment allow high throughput while minimizing overheating of any individual sample, because any given sample will be irradiated less frequently compared to the embodiment shown in FIG. 2. Referring now to FIG. 4, a high-throughput laser desorption/ionization mass spectrometer having three laser generators 130, 132, 134 is depicted. Features of this embodiment are similar to the embodiment described above and illustrated in FIG. 2. However, in this embodiment, laser generators 130, 132, 134 are each focused onto a different sample. For instance, radiation from the first laser generator 130, the second laser generator 132, and the third laser generator 134 is focused onto the first sample 160, the second sample 162, and the third sample 164, respectively.

In use, the timing control circuit 138 triggers the first laser generator 130 to emit a laser pulse 140 for ionization of the first sample 160, resulting in an ion packet. After a certain delay time (optional), an extraction pulse generated by an extraction pulse circuit 120 is applied to a sample plate 106 to accelerate the ions in the ion packet towards the TOF analyzer 112. Next, the second laser 132 is triggered and the second sample 162 is ionized, producing an ion packet which is then accelerated towards the TOF analyzer 112 by a corresponding extraction pulse. The third laser 134 is triggered next to obtain an ion packet from the third sample 164, followed by extraction of the ions produced. When the last laser of the series (i.e. the third laser 134 in this example) has fired, the process continues with the firing of the first laser 130, etc.

Signals received from the ion detector/preamplifier 114 (spectra) are received by the data acquisition/processing system 116. The spectra generated from the first sample 160, the second sample 162, and the third sample 164 are recorded and stored into the first memory 150, second memory 152, and third memory 154, respectively. The sample plate 106 is mounted on a three-way adjustable stage 158 allowing the sample plate to be positioned as desired in three axes (i.e. x-, y-, and z-axes). In a preferred embodiment, one of the samples can be a standard calibrating sample used for mass calibration which is an important step to achieve high mass accuracy. There may be more samples deposited on the sample plate 106 than there are laser generators; in such a case, once the desired number of spectra of the first group of samples (i.e. the first sample 160, the second sample 162, and the third sample 164) are recorded, the sample plate is moved so that the laser generators will fire on three new samples (i.e. a fourth sample, a fifth sample, and a sixth sample), and so on. The spectral data obtained from the higher samples may be stored in additional memories or may be stored in subdivided portions of the first, second, and/or third memories. Typically, a single memory is used to store data obtained under similar conditions (e.g. same sample, same laser). Other well known memory management methods may be used to handle the spectral data.

Figure 5:
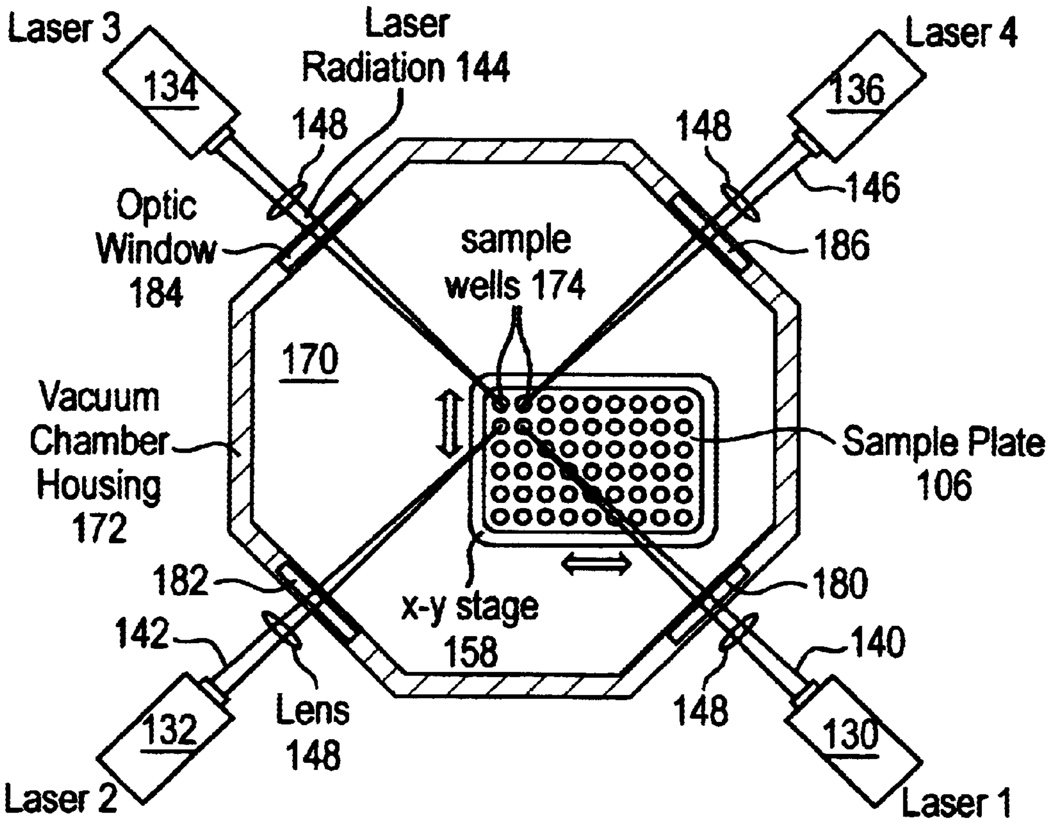
FIG. 5 depicts an ion source having the samples arranged on an X-Y stage, where each laser is focused on a separate sample.

FIG. 5 is a perspective top view of an embodiment of the invention similar to that described in FIG. 4. The sample plate 106 mounted on the three-way adjustable stage 158 is placed in a vacuum chamber 170 defined by a vacuum chamber housing 172. The sample plate 106 includes a multiple sample array deposited with analytes or calibrants. In FIG. 5 an array of 9×6=54 sample wells is illustrated, but the array can be made with more wells, for instance, 1000.

In other embodiments, the three-way adjustable stage may be other than an x-y-z adjustable stage, for example, the three way adjustable stage may function with a rotational axis and two translational axes (i.e. an 'omega' axis, an 'r' axis, and a 'z' axis) or with two rotational axes and one translational axis (i.e. an 'omega' axis, a 'phi' axis, and an 'r' axis). Alternatively, the sample plate 106 may be mounted on a two-way adjustable stage (e.g. an x-y stage or an omega-r stage). The sample wells 174 are typically about 0.2 to about 5 mm in diameter, preferably about 0.5 to about 3 mm in diameter, and the space between two wells is about 0.5 mm to about 10 mm, preferably about 2 mm to about 5 mm. The space between two sample wells must be determined such that the lasers or the samples or the ion signals produced do not interfere with each other. Arrangement of the sample wells is designed to allow rapid and easy control of the movement of the sample plate by means of computer automation. The sample wells may be arranged in an x-y array, in an array of concentric circles, or in any other convenient geometry.

In the embodiment depicted in FIG. 5, four laser generators 130, 132, 134, 136 are utilized and evenly placed outside of the vacuum chamber 170. However, fewer or more laser generators may be used. The laser generators may be the same type (same wavelength and sample power) but need not be. Radiation from the laser generators 130, 132, 134, 136 is focused at the sample wells 172 through optic windows 180, 182, 184,186 which are substantially transparent to the laser radiation and which separate the vacuum and the atmospheric pressure. Similar to the embodiment shown in FIG. 4, each of the laser generators 130, 132, 134, 136 may be directed at separate sample spots, as shown in FIG. 5. Alternatively, all of the laser generators 130, 132, 134, 136 may be directed at the same sample spot, similar to the embodiment shown in FIG. 2.

Figure 6:
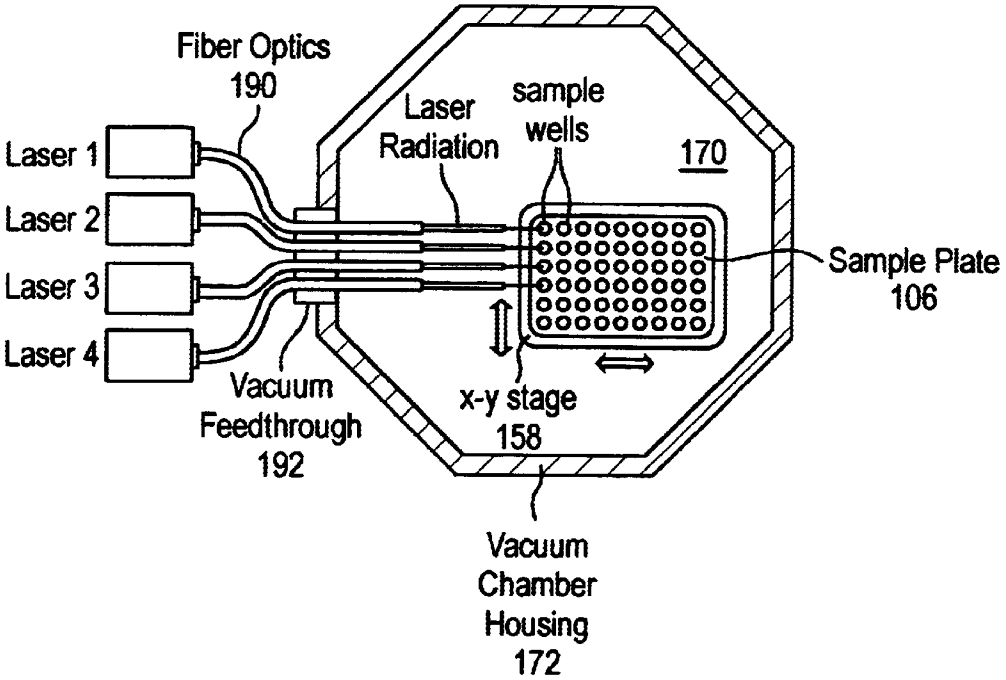
FIG. 6 shows an embodiment similar to that shown in FIG. 5, where the lasers are focused at the samples via fiber optics.

FIG. 6 depicts an embodiment similar to FIG. 5, except fiber optic filaments 190 are employed to transfer the laser radiation into the vacuum chamber 170. The sample plate 106 and its arrangement on a three-way adjustable stage 158 is similar to that shown in FIG. 5. As depisted in the figure, all the fiber optic filaments 190 are mounted in a single vacuum feedthrough 192, although other convenient means, such as individual vacuum feedthroughs may be used. This embodiment is advantageous in that it allows the laser radiation to be conveniently directed at the sample plate in a variety of configurations. FIG. 6 shows the fiber optic filaments directed at the sample plate in a one column by four row configuration. Other convenient configurations are, e.g. a two row by two column configuration or a four column by one row configuration. If more laser generators and optic filaments are added, other potential configurations are possible. In an alternate embodiment and similar to FIG. 2, all of the laser filaments may be directed at the same sample. An optic lens or other focusing means may optionally be used to focus the laser radiation on the sample.

A high throughput ion source having a plurality of lasers according to the present invention may be operated under a variety of conditions. For example, a mass spectrometer may be constructed incorporating the high throughput ion source using atmospheric pressure MALDI techniques such as described in the literature (see, e.g. Laiko et al. WO 99/63576). Depending on desired conditions (such as choice of mass analyzer coupled to the high throughput ion source) the sample to be ionized by the lasers may be under atmospheric pressure (about 760 at sea level, or about 500 to about 800 Torr), or may be under reduced pressure ranging from about 10 Torr to about $10^{-3}$ Torr, or from about $10^{-3}$ Torr to about $10^{-6}$ Torr, or from about $10^{-6}$ Torr to about $10^{-9}$ Torr.

In further exemplary embodiments, a high throughput ion source having a plurality of lasers according to the present invention may be used in conjunction with one or more mass analyzers, e.g. a plurality of mass analyzers in a tandem arrangement. For example, the ion source according to the present invention may be coupled with an ion cyclotron resonance mass analyzer in a Fourier transform-ion cyclotron resonance mass spectrometer (FT-ICR-MS). As another example, the ion source according to the present invention may be coupled with a quadropole-time-of-flight (Q-TOF) tandem mass analyzer in a Q-TOF tandem mass spectrometer. The high throughput source may be adapted to other tandem mass spectrometer applications, as well. Given the disclosure and examples herein, one of skill in the art will be able to readily practice such designs.

Instruments according to the present invention may be particularly useful in performing mass spectrometric analysis of very large molecules (up to several hundred thousand Daltons), for example, biomolecules such as proteins or nucleic acids.

While the foregoing embodiments of the invention have been set forth in considerable detail for the purpose of making a complete disclosure of the invention, it will be apparent to those of skill in the art that numerous changes may be made in such details without departing from the spirit and the principles of the invention. Accordingly, the invention should be limited only by the following claims.

All patents, patent applications, and publications mentioned herein are hereby incorporated by reference in their entireties.

What is claimed is:

1. An ion source for a mass spectrometer comprising a timing control circuit, a first laser in operable relation to the timing control circuit, and a second laser in operable relation to the timing control circuit, said timing control circuit capable of:

a) firing the first laser, b) triggering an extraction pulse, c) firing the second laser after the first laser has been fired, d) triggering another extraction pulse, and e) repeating steps a) through d) at least once.

2. An ion source comprising a sample plate having multiple sample sites and a plurality of lasers in operable relation to the sample plate, the lasers being controlled via a timing control circuit, the timing control circuit capable of firing the lasers consecutively, thereby producing a series of laser pulses, each laser pulse having a corresponding extraction pulse which occurs prior to the next laser pulse in the series, each extraction pulse capable of delivering ions generated by the firing of the laser to a mass analyzer in operable relation to the high throughput MALDI source.

3. A mass spectrometer comprising a timing control circuit, a first laser in operable relation to the timing control circuit, and a second laser in operable relation to the timing control circuit, said timing control circuit capable of:

a) firing the first laser to generate a laser pulse, b) triggering an extraction pulse, c) firing the second laser to generate a laser pulse after the first laser has been fired, d) triggering another extraction pulse, and e) repeating steps a) through d) at least once.

4. The mass spectrometer of claim 3, wherein the generation of laser pulses occurs at a rate of at least 10 Hz.

5. The mass spectrometer of claim 3, wherein the generation of laser pulses occurs at a rate of at least 100 Hz.

6. The mass spectrometer of claim 3, wherein the generation of laser pulses occurs at a rate of at least 1000 Hz.

7. The mass spectrometer of claim 3, wherein said timing control circuit is capable of repeating steps a) through d) at least five times per second.

8. The mass spectrometer of claim 3, wherein said timing control circuit is capable of repeating steps a) through d) at least twenty times per second.

9. The mass spectrometer of claim 3, wherein said timing control circuit is capable of repeating steps a) through d) at least fifty times per second.

10. The mass spectrometer of claim 3, wherein the first laser is directed at a first sample site and the second laser is directed at a second sample site.

11. The mass spectrometer of claim 3, wherein the first laser is directed at a first sample site and the second laser is directed at the first sample site.

12. The mass spectrometer of claim 3, further comprising a third laser in operable relation to the timing control circuit said timing control circuit being capable of, after step d):

d1) firing the third laser to generate a laser pulse, and d2) triggering another extraction pulse, said steps d1) and d2) occurring each time steps a) through d) occur.

13. The mass spectrometer of claim 3, wherein the first laser emits a pulse of radiation at a first wavelength and the second laser emits a pulse of radiation at a second wavelength, wherein the first wavelength is different from the second wavelength.

14. The mass spectrometer of claim 3, wherein the first laser emits a pulse of radiation at a first wavelength and the second laser emits a pulse of radiation at a second wavelength, wherein the first wavelength is the same as the second wavelength.

15. The mass spectrometer of claim 3, further comprising a time of flight mass analyzer in operable relation to the first and second lasers.

16. The mass spectrometer of claim 3, further comprising an ion cyclotron resonance mass analyzer in operable relation to the first and second lasers.

17. The mass spectrometer of claim 16, wherein the mass spectrometer is a Fourier Transform Ion Cyclotron Resonance (FT-ICR) mass spectrometer.

18. The mass spectrometer of claim 3, further comprising a quadropole mass analyzer in operable relation to the first and second lasers.

19. The mass spectrometer of claim 3 comprising tandem mass analyzers.

20. The mass spectrometer of claim 3, wherein the lasers are directed at a sample plate in a chamber, wherein the pressure in the chamber is between about $10^{-6}$ Torr and about $10^{-9}$ Torr.

21. The mass spectrometer of claim 3, wherein the lasers are directed at a sample plate in a chamber, wherein the pressure in the chamber is between about $10^{-3}$ Torr and $10^{-6}$ Torr.

22. The mass spectrometer of claim 3, wherein the lasers are directed at a sample plate in a chamber, wherein the pressure in the chamber is between about 10 Torr and about $10^{-3}$ Torr.

23. The mass spectrometer of claim 3, wherein the lasers are directed at a sample plate in a chamber, wherein the pressure in the chamber is between about 10 Torr and about 1000 Torr.

24. A method of introducing ion packets into a mass analyzer in a mass spectrometer, the method comprising:

a) directing a pulse of laser radiation from a first laser onto a first sample to produce a first ion packet, b) producing an extraction pulse capable of introducuig the first ion packet into the mass analyzer, c) after step a), detecting a pulse of laser radiation from a second laser onto said first sample or onto a second sample to produce a second ion packet;

d) producing an extraction pulse capable of introducing the second ion packet into the mass analyzer, and e) repeating steps a) through d) at least once.

25. The method of claim 24, wherein the second laser is directed at the second sample spot on the sample plate.

26. The method of claim 24, wherein the second laser is directed at the first sample spot on the sample plate.

27. The method of claim 24, wherein the pulses of laser radiation occur at a rate of at least 10 Hz.

28. The method of claim 24, wherein the pulses of laser radiation occur at a rate of at least 100 Hz.

29. The method of claim 24, wherein the pulses of laser radiation occur at a rate of at least 1000 Hz.

30. The method of claim 24, wherein steps a) through d) are repeated at least five times per second.

31. The method of claim 24, wherein steps a) through d) are repeated at least twenty times per second.

32. The method of claim 24, wherein steps a) trough d) are repeated at least fifty times per second.

33. The method of claim 24, further comprising, after step d), the steps of:

d1) directing a pulse of laser radiation from a third laser onto said first sample or onto a third sample to produce a third ion packet;

d2) producing an extraction pulse capable of introducing the third ion packet into the mass analyzer, said steps d1) and d2) occurring each time steps a) through d) occur.

34. The method of claim 24, wherein the pulse of laser radiation from the first laser has a first wavelength and the pulse of laser radiation from the second laser has a second wavelength, wherein the first wavelength is different from the second wavelength.

35. The method of claim 24, wherein the pulse of laser radiation from the first laser has a first wavelength and the pulse of laser radiation from the second laser has a second wavelength, wherein the first wavelength is the same as the second wavelength.

36. The method of claim 24, wherein the mass analyzer is a time of flight mass analyzer.

37. The method of claim 24, wherein the mass analyzer is an ion cyclotron resonance mass analyzer.

38. The method of claim 37, wherein the mass spectrometer is a Fourier Transform Ion Cyclotron Resonance (FT-ICR) mass spectrometer.

39. The method of claim 24, wherein the mass analyzer is a quadropole mass analyzer.

40. The method of claim 24, wherein the sample is in a chamber and the pressure in the chamber is between about $10^{-6}$ Torr and about $10^{-9}$ Torr.

41. The method of claim 24, wherein the sample is in a chamber and the pressure in the chamber is between about $10^{-3}$ Torr and $10^{-6}$ Torr.

42. The method of claim 24, wherein the sample is in a chamber and the pressure in the chamber is between about 10 Torr and about $10^{-3}$ Torr.

43. The method of claim 24, wherein the sample is in a chamber and the pressure in the chamber is between about 10 Torr and about 1000 Torr.

* * * * *